United States Patent
Sella

(10) Patent No.: US 10,091,107 B2
(45) Date of Patent: *Oct. 2, 2018

(54) NETWORK PATH SELECTION USING BANDWIDTH PREDICTION

(71) Applicant: Level 3 Communications, LLC, Broomfield, CO (US)

(72) Inventor: William Thomas Sella, Parker, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/605,468

(22) Filed: May 25, 2017

(65) Prior Publication Data

US 2017/0339057 A1 Nov. 23, 2017

Related U.S. Application Data

(63) Continuation of application No. 14/961,551, filed on Dec. 7, 2015, now Pat. No. 9,667,542, which is a
(Continued)

(51) Int. Cl.
*H04L 12/741* (2013.01)
*H04L 12/24* (2006.01)
(Continued)

(52) U.S. Cl.
CPC ........ *H04L 45/745* (2013.01); *H04L 41/0654* (2013.01); *H04L 41/12* (2013.01);
(Continued)

(58) Field of Classification Search
CPC ............ H04L 45/28; H04L 2012/5627; H04L 41/0659; H04L 41/0654; H04L 47/10;
(Continued)

(56) References Cited

U.S. PATENT DOCUMENTS

| | | | |
|---|---|---|---|
| 6,775,701 B1* | 8/2004 | Pan | H04L 41/0896 709/226 |
| 7,554,930 B2* | 6/2009 | Gaddis | H04L 45/02 370/254 |

(Continued)

FOREIGN PATENT DOCUMENTS

WO   WO-2012164958 A1   12/2012

OTHER PUBLICATIONS

European Examination Report, dated May 6, 2016, Application No. 15162363.4, filed Apr. 2, 2016; 8 pgs.
(Continued)

*Primary Examiner* — Dady Chery

(57) ABSTRACT

In an embodiment, a system routes a new data stream from a source to a destination through a plurality of forwarding devices interconnected with links. The system includes a control device that receives a request to create a path through the plurality of interconnected forwarding devices for a new data stream and determines a type of the new data stream. A data flow database stores historical usage characteristics of data streams having the determined type. A path computation module determines, based on the historical usage characteristics of data streams having the determined type, the requested path through plurality of interconnected forwarding devices from the source to the destination.

20 Claims, 7 Drawing Sheets

Related U.S. Application Data continuation of application No. 14/332,843, filed on Jul. 16, 2014, now Pat. No. 9,210,077, which is a continuation of application No. 14/250,132, filed on Apr. 10, 2014, now Pat. No. 8,811,172.

(51) Int. Cl.
  *H04L 12/729* (2013.01)
  *H04L 12/715* (2013.01)
  *H04L 12/717* (2013.01)
  *H04L 12/26* (2006.01)

(52) U.S. Cl.
  CPC ........ *H04L 43/0876* (2013.01); *H04L 45/125* (2013.01); *H04L 45/42* (2013.01); *H04L 45/64* (2013.01); *H04L 41/142* (2013.01)

(58) Field of Classification Search
  CPC . H04L 2012/5631; H04L 47/15; H04L 47/70; H04L 47/2441; H04J 2203/006
  USPC ....... 370/216, 217, 218, 225, 228, 235, 237, 370/229, 230
  See application file for complete search history.

(56) References Cited

U.S. PATENT DOCUMENTS

| | | | |
|---|---|---|---|
| 8,374,090 B2 | 2/2013 | Morrill et al. | |
| 8,514,718 B2 | 8/2013 | Zijst | |
| 8,526,985 B2 | 9/2013 | Cilli et al. | |
| 8,611,355 B1 | 12/2013 | Sella et al. | |
| 8,619,600 B2 | 12/2013 | Morrill et al. | |
| 8,619,820 B2 | 12/2013 | Edwards et al. | |
| 8,654,629 B1 | 2/2014 | Craig et al. | |
| 8,682,812 B1 | 3/2014 | Ranjan | |
| 8,687,498 B2 | 4/2014 | Imai | |
| 2008/0049615 A1 | 2/2008 | Bugenhagen | |
| 2012/0054255 A1 | 3/2012 | Buxbaum et al. | |
| 2014/0064086 A1 | 3/2014 | Wiley et al. | |
| 2015/0295822 A1 | 10/2015 | Sella | |
| 2016/0156556 A1 | 6/2016 | Sella | |

OTHER PUBLICATIONS

Extended European Search Report, dated Jul. 3, 2015, Application No. 15162363.4, filed Apr. 2, 2015; 9 pgs.

International Preliminary Report on Patentability, dated Oct. 12, 2016, Int'l Appl. No. PCT/US15/024152, Int'l Filing Date Apr. 2, 2015; 11 pgs.

International Search Report, dated Jul. 10, 2015, Int'l Appl. No. PCT/US15/024152, Int'l Filing Date Apr. 2, 2015; 3 pgs.

Written Opinion of the International Searching Authority, dated Jul. 10, 2015, Int'l Appl. No. PCT/US15/024152, Int'l Filing Date Apr. 2, 2015; 9 pgs.

* cited by examiner

NETWORK PATH SELECTION USING BANDWIDTH PREDICTION

BACKGROUND

Field

This field is generally related to network routing.

Related Art

A communication network may, for example, provide a network connection that allows data to be transferred between two geographically remote locations. A network connection may span multiple links connecting communication devices such as routers. Networks may have different topologies depending on how the links are interconnected through the communication devices. Given a particular network topology, multiple routes may be available between a source and destination. Some routes may be more desirable than others depending on current capacity and usage.

Traditional routing algorithms rely on local information each router has from its neighboring links and devices to route data. A router maintains such information in a routing table. And, based on the destination address of an incoming packet, a router uses its routing table to forward the packet to a specific neighboring device. To develop the routing table, each router uses a protocol like Open Shortest Path First (OSPF) to exchange routing and reachability information with local neighboring routers. In this way, each router both forwards packets and conducts control functions to update its own routing table.

While using local information may be desirable in some contexts, it may not always route data efficiently. To route data more efficiently, another technique, referred to as Software Defined Networks (SDNs), separates the control and forwarding functions into separate devices. The control device uses a global knowledge of the network topology to determine a path through the network of forwarding devices for individual data flows. In this way, the control device may, for example, establish paths that minimize delay or maximize bandwidth through the network.

BRIEF SUMMARY

In an embodiment, a system routes a new data stream from a source to a destination through a plurality of forwarding devices interconnected with links. The system includes a control device that receives a request to create a path through the plurality of interconnected forwarding devices for a new data stream and determines a type of the new data stream. A data flow database stores historical usage characteristics of data streams having the determined type. A path computation module determines, based on the historical usage characteristics of data streams having the determined type, the requested path through plurality of interconnected forwarding devices from the source to the destination. And a routing table module, for respective forwarding devices along the path, (i) determines a routing table indicating which port of the forwarding device to use to route data from the new data stream along the determined path, and (ii) transmits the determined routing table to configure the forwarding device to route data along the path.

Method and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

As mentioned above, software defined networks (SDNs) can beneficially account for the global network topology in making routing decisions. In doing so, SDNs may be able to look at historical usage of various interconnecting links on the network to determine which path to select for a particular data flow.

Embodiments disclosed herein account for not only the historical usage of the network links, but also historical characteristics of similar data flows. For example, embodiments may determine that data flows of a particular type—such as, for example, HTTP (Hypertext Transfer Protocol) sessions to salesforce.com—have an average bandwidth and duration. Embodiments may evaluate that average bandwidth and availability against the collected data describing the past bandwidth and availability of similar flows traversing links along the path.

To cut down on the computing resources needed when data is routed through the network, embodiments may pre-compute network paths for various data types. Further, embodiments may pre-compute the network paths for different times of day. Once pre-computed, the data paths may be stored in a database. Then, when a data stream having the data type is received, embodiments may retrieve the appropriate network path from the database.

Figure 1:
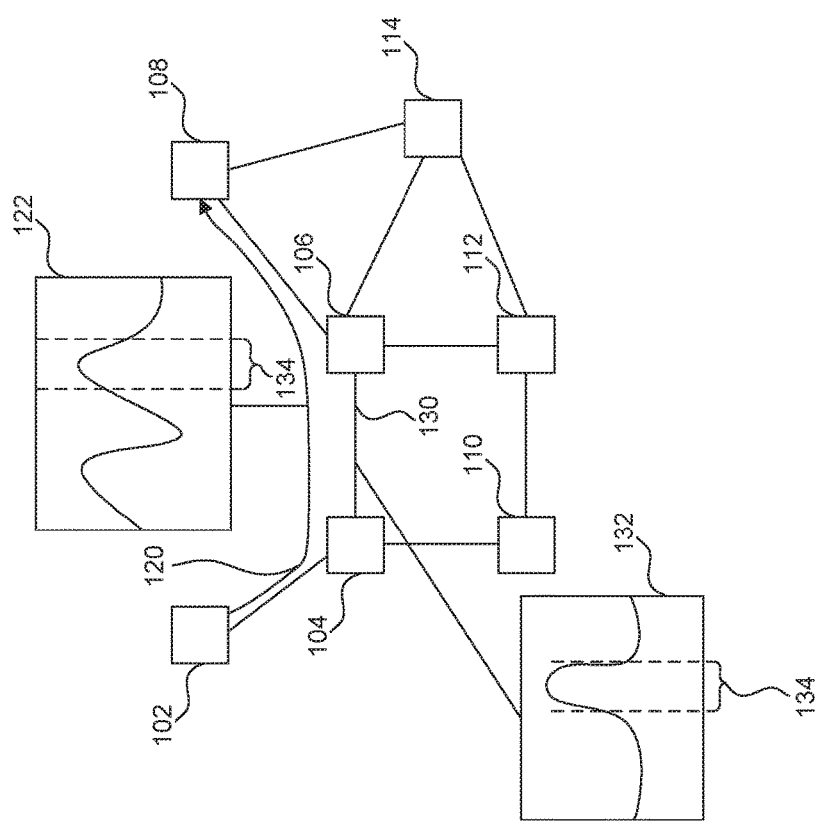
FIG. 1 is a diagram illustrating a communication network that determines a path for a data flow based on historical characteristics, according to an embodiment.

FIG. 1 is a diagram illustrating a communication network 100 that determines a path for a data flow based on historical characteristics, according to an embodiment. Communication network 100 may be a local area network (LAN), metropolitan area network (MAN), or wide area network (WAN). It may utilize any point-to-point or multipoint-to-multipoint networking protocols. The network access protocols used may include, for example, Multi-Protocol Label Switching (MPLS), Ethernet, Asynchronous Transfer Mode (ATM), High-Level Data Link Control (HDLC), or Packet Relay.

Communication network 100 includes a plurality of forwarding devices, such as forwarding devices 102, 104, 106, 108, 110, 112, and 114, interconnected by links. For example, forwarding devices 104 and 106 are connected by a link 130. The forwarding devices are devices that forward packets, including devices at the data link layer (Open Systems Interconnection layer 2) and the network layer (Open Systems Interconnection layer 3).

Link 130 may have the usage pattern illustrated in a chart 132. The usage pattern may repeat over a particular cycle, such as one week, reflecting cyclical patterns. The cycle may be divided into time slices, such as five minute intervals. For each five minute interval, link 130 may have an average utilization, in other words an average amount of bandwidth being used. And, as a corollary, link 130 may also have an average availability, in other words an average amount of available bandwidth across the line. As illustrated in chart 132, the bandwidth utilized across link 130 spikes during a time slice 134.

Not only does FIG. 1 show that the bandwidth utilized across link 130 spikes during time slice 134, FIG. 1 also shows that, during time slice 134, the bandwidth used by a data flow 120 also spikes. In particular, FIG. 1 shows that data flow 120 is being transferred from forwarding device 102 to forwarding device 108. The data may be the form of data flow from a particular source computing device or network and to a particular destination computing device or network. Data flow 120 has a usage pattern illustrated in a chart 122, and chart 122 shows that the data flow spikes during time slice 134.

Based this historical data for link 130 and data flow 120, communication network 100 determines whether, during time slice 134, link 130 may have insufficient capacity to transfer data flow 120 without the network becoming saturated and overloaded. Accordingly, the communication network 100 may redirect data flow 120 onto a different path as illustrated in FIG. 2.

Figure 2:
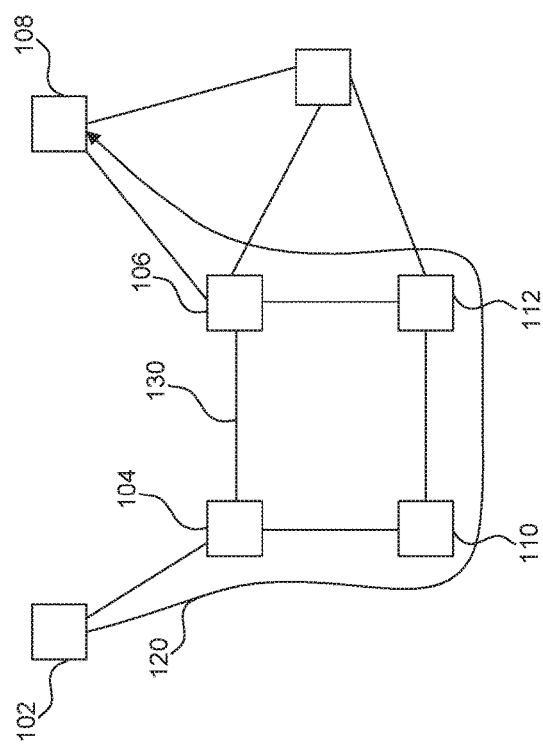
FIG. 2 is a diagram illustrating how the data flow is directed along the determined path, according to an embodiment.

FIG. 2 is a diagram illustrating how data flow 120 is redirected along a determined path in the communication network 100, according to an embodiment. In this example, communication network 100 determines, according to historical usage data of the interconnecting links, an alternate path for data flow 120. The alternate path avoids link 130, connecting forwarding devices 104 and 106. Instead, data flow 120 is transferred from forwarding device 104 around forwarding devices 110 and 112 to forwarding device 106. In this way, embodiments use historical data to predict how data flow 120 may impact network utilization among various links and to route the path to avoid potential bottlenecks.

The remainder of the Detailed Description is divided into four sections. The first section describes, with respect to FIG. 3, collecting the historical network data. The second section describes, with respect to FIGS. 4A-B, using a control device to establish a path through the network. The fourth section describes, with respect to FIG. 5, calculating a path in greater detail. The fifth and final section describes, with respect to FIG. 6, a method for determining a path according to historical characteristics for a data flow and configuring the path through the network.

Collecting Historical Data

Figure 3:
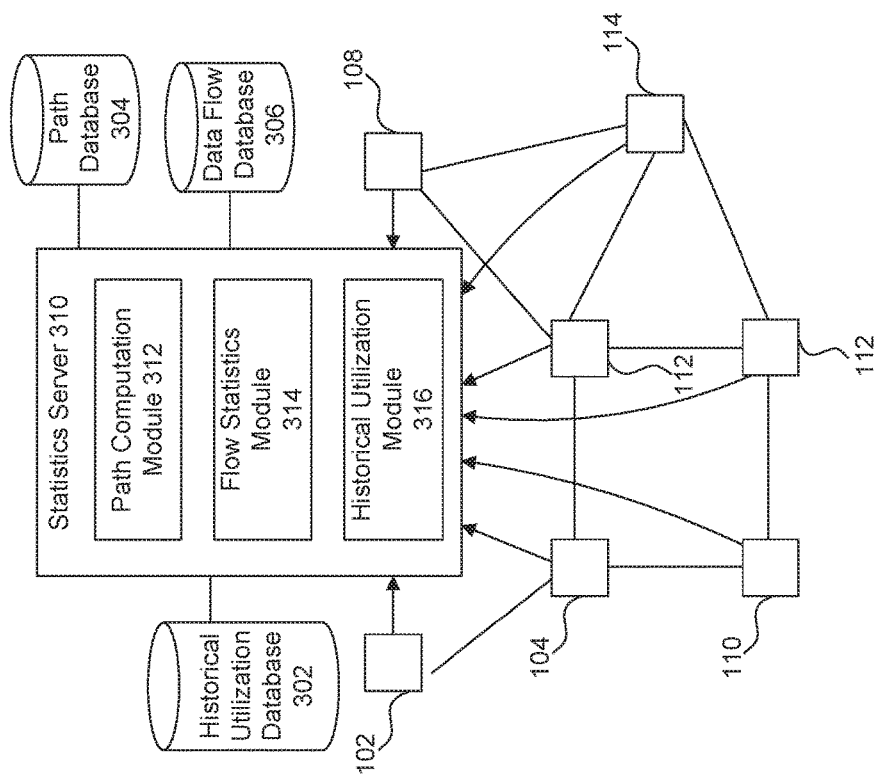
FIG. 3 is a diagram illustrating a statistics server that collects data on network characteristics.

FIG. 3 is a diagram illustrating a system 300 for collecting statistics along a path. System 300 includes the forwarding devices of communication network 100 illustrated in FIGS. 1 and 2. System 300 also includes a statistics server 310 that collects data on network characteristics. Statistics server 310 is coupled to a historical utilization database 302, a path database 304, and a data flow database 306, and includes a historical utilization module 316, a flow statistics module 314, and a path computation module 312. Each module is discussed in turn.

Historical utilization module 316 collects historical usage data of the network. In particular, historical utilization module 316 may collect the amount of bandwidth utilized on each link of the network. More particularly, historical utilization module 316 may collect the amount of bandwidth utilized on each link of the network during each time slice of a time cycle. To collect the bandwidth data, historical utilization module 316 may communicate with the various network forwarding devices, which monitor link utilization.

On collecting the utilization information, historical utilization module 316 stores the information in historical utilization database 302. As multiple time cycles elapse, historical utilization module 316 may aggregate data for each slice. For example, historical utilization module 316 may determine an average, or a moving average, of utilization across each link during the time slice. Historical utilization module 316 may also determine a variance of the utilization across each link during the time slice. The variance may indicate a level of confidence (e.g., known statistical method such as the 95th percentile) in the average utilization and, using known statistical methods, may be used in predicting whether the link will have the availability in the future.

In addition to collecting data on link usage, statistics server 310 also collects data on data flows using flow statistics module 314. Like historical utilization module 316, flow statistics module 314 may communicate with the various forwarding devices to collect data on the data flows. A data flow may be identified as data having a particular type, and the type may be defined as data having a particular source Internet Protocol (IP) address, source Transport Control Protocol (TCP) or User Datagram Protocol (UDP) port, destination IP address, destination TCP port, or any combination thereof. For example, one data type may be HTTP data (which has destination TCP port 80) addressed to salesforce.com (which has a particular destination IP address).

Flow statistics module 314 collects data describing attributes consistent with that type of data flow. For example, flow statistics module 314 may collect data on an amount of bandwidth consumed by a particular data flow and a length of the particular data flow. The length may be measured, for example, in time duration or a total amount of data transferred. Once collected, flow statistics module 314 may store the attributes in data flow database 306. Like historical utilization module 316, once flow statistics module 314 collects the data, it may aggregate it. Flow statistics module 314 may aggregate the data by, for example, taking an average or a moving average. In particular, flow statistics module 314 may determine an average amount of bandwidth and an average length for each type of data flow. The difference in addition to the averages, flow statistics module 314 may also determine a variance of the various attributes. Like with historical utilization module 316, the variance may be used, using known statistical techniques, to establish a confidence in predicting whether a link can handle a data flow. Not all flows may be required to be collected: a statistical sampling of flows may be used to aggregate information used to describe particular flows.

Based on the historical usage characteristics of data streams having the determined type, path computation module 312 determines a path through a plurality of interconnected forwarding devices from the source to the destination for each data type. The path may includes network links and forwarding devices. In an embodiment, the path does not include the control device. For each data type, path computation module 312 may determine a path defining how to transmit the data flow through the network during each time slice. Still further, as mentioned above, the data type may be identified as a data flow having a particular source and destination or it may be identified as having just a particular source or a particular destination. In that case, not only may path computation module 312 compute paths for each time slice, path computation module 312 may compute paths for various possible sources or destinations that may transmit or receive flows having the type. More detail on how path computation module 312 computes the paths is provided below with respect to FIG. 5.

In addition to historical usage, path computation module 312 may take into account latency, jitter, packet loss, or any other performance metric across various paths, the user's service level agreement, or the type of data being transferred. For example, broadcast video data may require a great deal of bandwidth, but latency may be relatively unimportant. Voice-over-IP (VoIP) data, on the other hand, may not require as much bandwidth, but latency may be more important. For broadcast video data, the control device could select a high-bandwidth, high-latency path, and, for VoIP data, the control device could select a low-bandwidth, low-latency path.

Also, path computation module 312 may route data through a particular server. For example, data having a certain type or directed to a certain destination may need to be scrubbed by a particular scrubbing server en route. The scrubbing server may be used to scan the data for malicious content, to monitor incoming data, or to perform other analysis on the data. In that embodiment, the control device may determine the path such that it goes through the particular scrubbing server or set of servers.

Figure 4A:
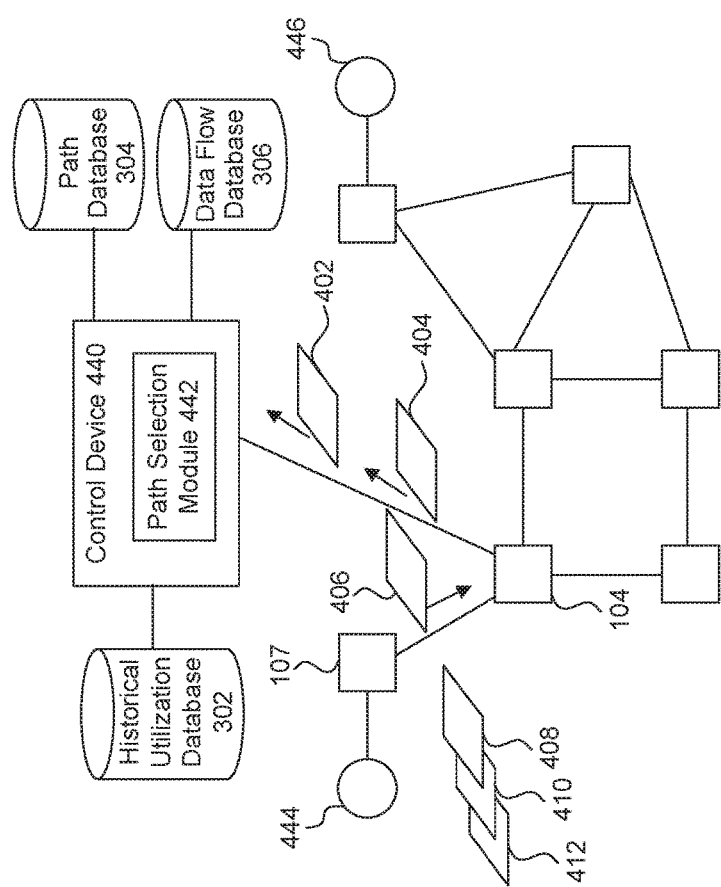
FIGS. 4A-B are diagrams illustrating configuration of the network to route data over the path.
Figure 4B:
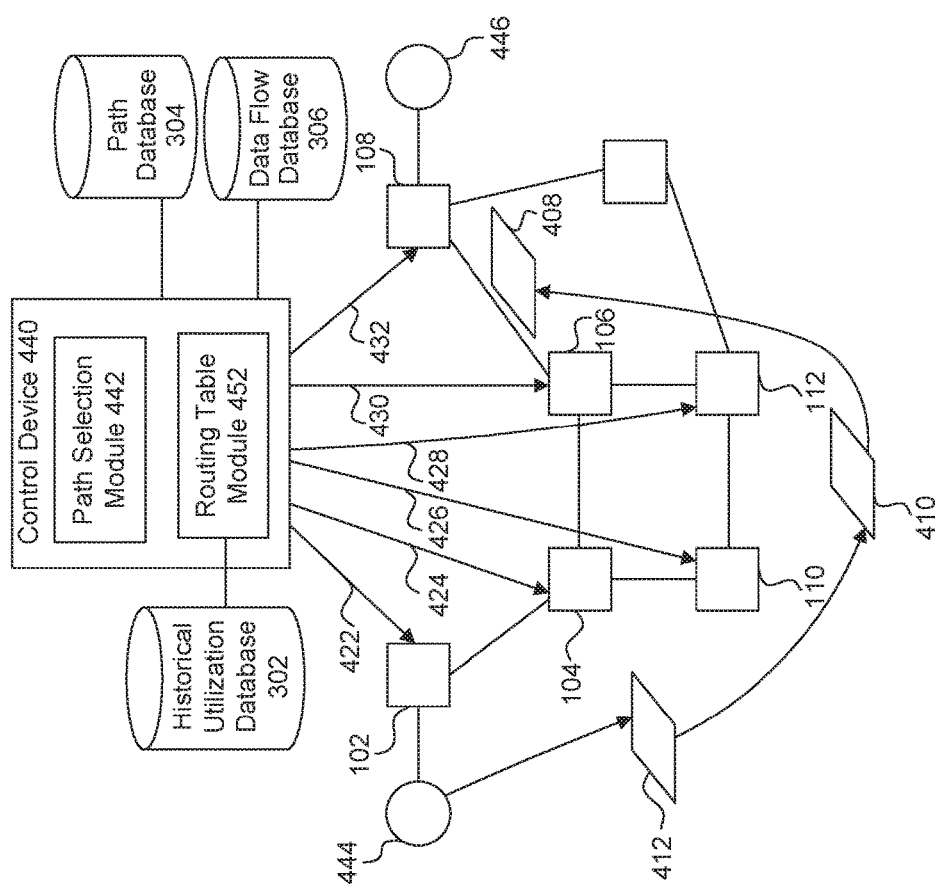

Once path computation module 312 computes the paths, path computation module 312 stores them in path database 304, which is used to route data through the network as illustrated in FIGS. 4A-B.

Establishing Fast Paths for New Data Streams

FIGS. 4A-B are diagrams illustrating configuration of the network to route data over the path using a control device 440.

FIG. 4A shows a diagram 400 illustrating a data stream transmitted from network user 444 to destination server 446. The data stream includes packets 402, 404, 406, 408, 410, and 412. When the first packet of the data stream—packet 402—reaches forwarding device 102, it is routed to control device 440. Control device 440 determines that this packet belongs to a new data stream and starts the process of establishing a fast path for the stream.

To determine the path, control device 440 may utilize path computation module 312 in FIG. 3 to compute the path in real time. As described above for FIG. 3 and in greater detail below for FIG. 5, the computation may take into account an amount of bandwidth that type of data flow has historically consumed. Alternatively, control device 440 may retrieve a pre-computed path. For retrieval of a pre-computed path, path control device 440 includes a path selection module 442 that, when a new data stream is received at control device 440, retrieves the requested path from path database 304.

As mentioned above, path database 304 includes paths associated with various types. In embodiments, a type may be defined by the source and destination IP address or the source and destination port. For example, path database 304 may have a path associated with data from the IP address of source port 444 to the IP address of destination 446 and having a TCP destination port 80, designating HTTP traffic. Path database 304 may have an entry for that type, indicating a path. Path database 304 may also have multiple entries for that type, each with a path for a different time slice. In that embodiment, path database 304 may retrieve the path for the type of the data flow at a time slice corresponding to the current time.

After determining the fast path, the control device updates routing tables for each forwarding device along the path as illustrated in FIG. 4B.

FIG. 4B shows a diagram 450 illustrating how control device 440 configures the network forwarding devices to establish the path between user 444 and server 446. Control device 440 includes a routing module 452 that sets up the path selected by path selection module 442.

According to the selected path, routing table module 452 determines routing tables for respective forwarding devices along the path. In particular, for each of the respective forwarding devices, routing table module 452 may determine a routing table that indicates which port to route data from the data stream. The routing tables indicate how to forward data such that data from the data stream will be routed along the path. In one embodiment, the updated routing tables may instruct the forwarding device how to forward packets having a particular combination of source/destination addresses and source/destination ports. In an alternative embodiment, the data stream may be identified with a label and the updated routing table may indicate how to forward packets having the label.

Routing table module 452 transmits the respective routing tables to configure the respective forwarding devices along the path. In FIG. 4B, control device 102 determines that the data stream between user 444 and server 446 follows the path including forwarding devices 106, 108, 112, and 110. To configure the forwarding devices, the control device 102 sends the updated routing tables using the configuration commands 422, 424, 426, and 428. These configuration commands configure all the forwarding devices on the fast path connecting user 444 to destination 446. In particular, command 422 instructs forwarding device 102 to forward packets in the data stream to forwarding device 104; command 424 instructs forwarding device 104 to forward the packets to forwarding device 110; command 426 instructs forwarding device 110 to forward the packets to forwarding device 112; command 428 instructs forwarding device 112 to forward the packets to forwarding device 106; command 430 instructs forwarding device 106 to forward the packets to forwarding device 108; and command 428 instructs forwarding device 108 to forward the packets to destination 446. The control device may program forwarding devices using OpenFlow, Path Computation Element Protocol, or some other method.

On receipt of these packets, control device 102 routes them to their destination using a default path. In this way, while the path through the network is being established, packets may continue to be routed to their destination, avoiding the need to buffer the initial packets in the edge forwarding device.

Once the path is set up (e.g., the forwarding devices are configured with their new routing tables), data flows along the fast path set up by the control device. At this point, data may flow at a greater rate through the forwarding devices and lower end to end latency, since it no longer goes through the control device.

Computing the Path

Figure 5:
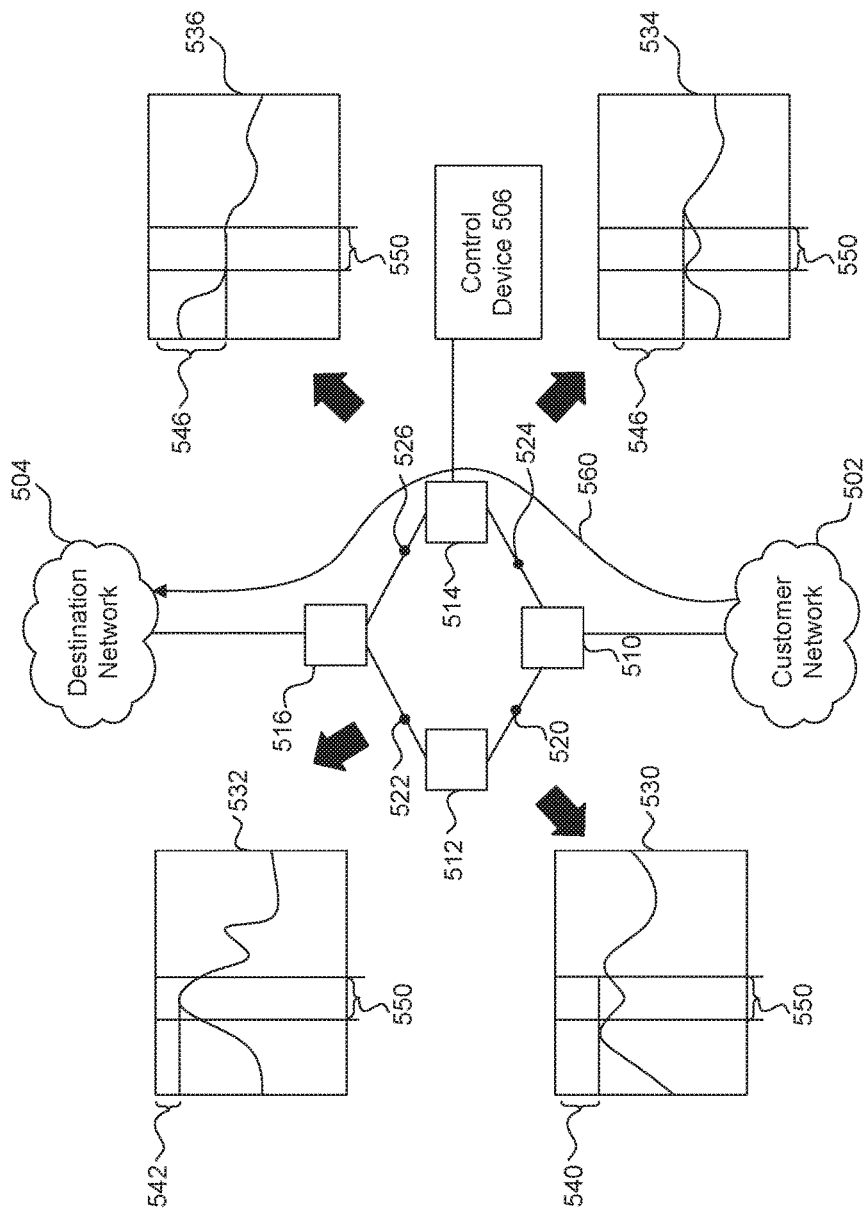
FIG. 5 is a diagram illustrating computation of the fast path in greater detail.

FIG. 5 is a diagram 500 of the calculation of a fast path in greater detail. Diagram 500 illustrates a network connecting customer network 502 to destination network 504. Customer network 502 is coupled to a forwarding device 510 and destination network 504 is coupled to a forward device 516. Forwarding devices 516 and 510 are connected to each other through forwarding devices 512 and 514. Each of the forwarding devices have routing tables that are determined by a control device 506.

The various forwarding devices are interconnected by links. In particular, forwarding device 510 is connected to forwarding devices 512 and 514 by links 520 and 524 respectively, and forwarding devices 512 and 514 are connected to forwarding device 516 by links 522 and 526 respectively.

As described above, historical usage data is collected for each of the links. The historical usage data may provide information on usage of the link over a periodic time cycle, such as one week. In diagram 500, link 500's historical usage information is illustrated in chart 530; link 524's usage information is illustrated in chart 534; link 522's usage information is illustrated in chart 532; and link 526's usage information scope illustrated in chart 536.

In addition to the collecting usage information on the links, information describing the data flows is also collected. In diagram 500, customer network 502 transmits a data flow 562 to destination network 504. Data flow 562 has a particular type defined by its source IP address, destination IP address, source port, destination port, or any combination thereof. Data is collected describing the behavior of data flow 562, for example, its duration and the bandwidth it consumes.

Based on the duration, a time period 550 is determined and used to calculate the path. Time period 550 is a portion of a particular time cycle, for example, including a plurality of time slices (e.g., 5 min. intervals within the week cycle). In the embodiment where the path is calculated in real-time when the data comes in, time period 550 may run from the current time until the end of the data flow's typical duration. For example, if the data flow is received on Monday at 5:25 PM and data flows of that type typically run for 20 minutes, then time period 550 may start at 5:25 PM run until 5:45 PM on Monday. Historical usage data collected during that time cycle may then be used to calculate the path.

In the embodiment where the paths are pre-computed and only selected when a new data flow comes in, a different time period may be determined for each time slice, and a path may be determined for each time period. For example, if the data flow typically runs for 20 minutes, a first time period may be determined as 12:00-12:20 AM on Sunday, the second time period may be determined as 12:05-12:25 AM on Sunday, and so on. Then, a path is calculated for each of the time periods. When a new data flow comes in, the path is selected that corresponds to the time that the data flows are received. In the example above, if the data flow is received at 12:00 AM on a Sunday, the path for the first time period would be selected; if the data flow is received at 12:05 AM on a Sunday, the path for the second time period would be selected; and so on.

To determine a path for a particular time period, various candidate paths are first determined, and historical usage along those candidate paths is evaluated and compared. Between customer network 502 and destination network 504, there are two candidate paths. The first candidate path is along links 520 and 522, and the second candidate path is along links 524 and 526.

To evaluate the first candidate path, historical usage during time period 550 is determined for links 520 and 522. As illustrated in chart 530 and 532, during time period 550, links 520 and 522 have an amount of available bandwidth 540 and 542 respectively. The available bandwidth may be the amount of additional capacity the link could handle before becoming saturated. It may also account for a failure scenario where one or more links in the network are down (such as other links in the network ring) and links 520 or 522 have to carry both its normal traffic and failover traffic that would have otherwise travelled over the down link. Link 520's and 522's available bandwidth is compared to the amount of bandwidth typically consumed by data flow 560. If the link 520 and 522 both have enough bandwidth for data flow 560, the first candidate path may be selected.

The same evaluation that is made for the first candidate path is also made for the second candidate path, which includes links 524 and 526. Historical usage during time period 550 is determined for links 524 and 526. As illustrated in chart 534 and 536, during time period 550, links 524 and 526 have an amount of available bandwidth 544 and 546 respectively. Link 524's and 526's available bandwidth is compared to the amount of bandwidth typically consumed by data flow 560. If the link 524 and 526 both have enough bandwidth for data flow 560, the first candidate path may be selected.

In an example, link 522's available bandwidth 542 may be insufficient for data flow 560. In that example, the second candidate paths may be selected.

If both paths have availability, other factors may be used to select which path to use. For example, the path with the most availability may be used. In another example, latency may be approximated and the path with the least latency may be selected.

Method

Figure 6:
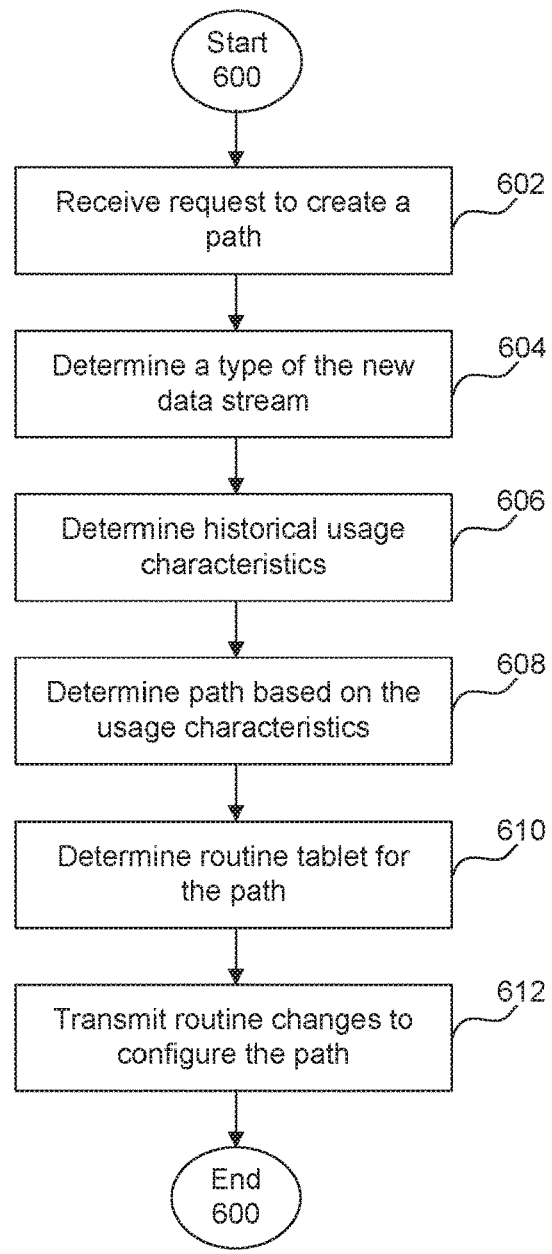
FIG. 6 is a flowchart illustrating a method for determining a path according to historical characteristics for a data flow and configuring the path through the network.

FIG. 6 is a flowchart illustrating a method 600 for determining a path according to historical characteristics for a data flow and configuring the path through the network.

At step 602, a request to create a path through the plurality of interconnected forwarding devices for a new data stream is received at a control device. The request may be in the form of a first packet in the data stream or other type of request.

At step 604, the new data stream's type may be determined. The type may be identified, for example, based on source IP address, destination IP address, source TCP port, or destination TCP port.

Based on the type, historical usage characteristics of the data stream are determined at step 606. The historical usage characteristics may include an amount of bandwidth utilized by data streams previously transmitted of the type and a length of data streams of the types that were previously transmitted.

Based on the data stream's historical usage characteristics, a path through a plurality of interconnected forwarding devices is determined at step 608. The path spans from the source to the destination. As described above, the path may be calculated when the request is received at step 602 or may be pre-calculated and only retrieved when the request is received at step 602.

In addition to the data stream's historical characteristics, historical usage information of the network links may also be used. The historical usage data may include utilization of the links at a plurality of time slices during a plurality of previous time cycles. Specifically, the time cycles may represent periodic time intervals having a pattern of repeated utilization. And, the time slices may represent sub-intervals in the periodic time intervals.

To calculate the path using the time slice data, which time slices the new data stream will occupy must be determined. The time slices may be determined based on the typical length of the data stream. Then, a plurality of candidate paths connecting the source and destination are evaluated. For each of the candidate paths, a utilization of links along the candidate path for the time slices that the new data stream will occupy is determined. And, based on the determined utilization of the links along the candidate path, an amount of available bandwidth on the path during the time slices is determined. Finally, the determined amount of available bandwidth for the plurality of candidate paths is compared with the data stream's needed bandwidth. Based on the comparison, a candidate path is selected for the new data stream at step 608.

Once the path is determined, routing tables are determined to implement the path at step 610. For respective forwarding devices along the path, a routing table is determined. The routing table indicates which port of the forwarding device to route data from the new data stream along the path determined at step 608.

Finally, at step 612, the routing tables are transmitted to configure the respective forwarding devices to forward data along the determined path.

CONCLUSION

The term "user," as used herein, may encompass both a customer of the network connectivity service, such as an employee of a business that utilizes the network connectivity service, and a network administrator of the service provider itself. Users may also be at different companies or organizations.

Historical utilization database 302, path database 304 and data flow database 306 may be any stored type of structured memory, including a persistent memory. In examples, each database may be implemented as a relational database, file system, document store, or BigData store.

Each of the devices and modules in FIG. 6 may be implemented in hardware, software, firmware, or any combination thereof.

Each of the devices and modules in FIG. 6 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for routing a data stream from a source to a destination through a network including a plurality of forwarding devices interconnected with links, comprising:

(a) receiving, at a control device, a request to create a path for the data stream from the source to the destination through the plurality of forwarding devices, the data stream having a type;

(b) determining the path based on historical usage characteristics of data streams having the type, the historical usage characteristics including an amount of bandwidth utilized by previously transmitted data streams of the type and a length of previously transmitted data streams of the type;

(c) for respective forwarding devices along the path, determining a routing table indicating which port of the respective forwarding device to route data from the new data stream along the path determined in (b); and (d) for each of the respective forwarding devices, transmitting the routing table determined in (c) to configure the forwarding device.

2. The computer-implemented method of claim 1, further comprising:

(e) determining the type of the data stream based on at least one of a source Internet protocol (IP) address, a destination IP address, a source transport control protocol (TCP) port, a destination TCP port, a source universal datagram protocol (UDP) port, and destination UDP port.

3. The computer-implemented method of claim 1, wherein the determining (b) is further based on at least one of historical link utilization information for the links and respective capacities of the links.

4. The computer-implemented method of claim 3, wherein the determining (b) is further based on the historical link utilization information, and the historical link utilization information for the links includes an average of link utilization and a variance of link utilization over a predetermined period of time.

5. The computer-implemented method of claim 1, wherein the determining (b) is further based on at least one of a latency requirement, a jitter requirement, a packet loss requirement, and a user's service level agreement.

6. The computer-implemented method of claim 1, further comprising:
(e) before the receiving (a), determining the historical usage characteristics of data streams having the type by statistically sampling previously transmitted data streams having the type.

7. The computer-implemented method of claim 1, wherein the data stream is identified with a label, and wherein the routing table determined in (c) indicates how to forward packets having the label.

8. The computer-implemented method of claim 1, wherein the path includes a server that performs scrubbing operations on packets of the data stream.

9. The computer-implemented method of claim 8, wherein the scrubbing operations include scanning the data stream for malicious content.

10. The computer-implemented method of claim 1, wherein the determining (b) includes retrieving a predetermined path for the data stream from a path database, wherein the predetermined path is determined prior to receiving the request based on the historical usage characteristics of data streams having the type.

11. A system for routing a data stream from a source to a destination through a network including a plurality of forwarding devices interconnected with links, comprising:
a control device configured to receive a request to create a path for the data stream from the source to the destination through the plurality of forwarding devices, the data stream having a type;
a path computation module configured to determine the path based on historical usage characteristics of data streams having the type, the historical usage characteristics including an amount of bandwidth utilized by previously transmitted data streams of the type and a length of previously transmitted data streams of the type; and
a routing table module configured to (i) for respective forwarding devices along the path, determine a routing table indicating which port of the respective forwarding device to route data from the new data stream along the path, and (ii) for each of the respective forwarding devices, transmit the determined routing table to configure the forwarding device.

12. The system of claim 11, wherein the control device is further configured to determine the type of the data stream based on at least one of a source interact protocol (IP) address, a destination IP address, a source transport control protocol (TCP) port, a destination TCP port, a source universal datagram protocol (UDP) port, and destination UDP port.

13. The system of claim 11, wherein determining the path is further based on at least one of historical link utilization information for the links and respective capacities of the links.

14. The system of claim 13, wherein the determining the path is based on the historical link utilization information, and the historical link utilization information for the links includes an average of link utilization and a variance of link utilization over a predetermined period of time.

15. The system of claim 11, wherein the determining of the path is further based on at least one of a latency requirement, a jitter requirement, a packet loss requirement, and a user's service level agreement.

16. The system of claim 11, further comprising:
a historical utilization module configured to determine the historical usage characteristics of data streams having the type by statistically sampling previously transmitted data streams having the type.

17. The system of claim 11, wherein the data stream is identified with a label, and wherein the routing table indicates how to forward packets having the label.

18. A non-transitory program storage device tangibly embodying a program of instructions executable by at least one machine to perform a method for routing a data stream from a source to a destination through a plurality of forwarding devices interconnected with links, the method comprising:
(a) receiving, at a control device, a request to create a path for the data stream from the source to the destination through the plurality of forwarding devices, the data stream having a type;
(b) determining the path based on historical usage characteristics of data streams having the type, the historical usage characteristics including an amount of bandwidth utilized by previously transmitted data streams of the type and a length of previously transmitted data streams of the type;
(c) for respective forwarding devices along the path, determining a routing table indicating which port of the respective forwarding device to route data from the new data stream along the path determined in (b); and
(d) for each of the respective forwarding devices, transmitting the routing table determined in (c) to configure the forwarding device.

19. The non-transitory program storage device of claim 18, the method further comprising:
(e) determining the type of the data stream based on at least one of a source Internet protocol (IP) address, a destination IP address, a source transport control protocol (TCP) port, a destination TCP port, a source universal datagram protocol (UDP) port, and destination UDP port.

20. The non-transitory program storage device of claim 18, wherein the determining (b) is further based on at least one of historical link utilization information for the links and respective capacities of the links.

* * * * *